United States Patent
Seibert (10) Patent No.: US 10,730,497 B2
(45) Date of Patent: Aug. 4, 2020

(54) MAIN BRAKE CYLINDER ARRANGEMENT HAVING A POSITION ENCODER ELEMENT AND A SEAL ARRANGEMENT

(71) Applicant: Lucas Automotive GmbH, Koblenz (DE)

(72) Inventor: Werner Seibert, Kammerforst (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/467,425

(22) PCT Filed: Nov. 24, 2017

(86) PCT No.: PCT/EP2017/080316
§ 371 (c)(1),
(2) Date: Jun. 6, 2019

(87) PCT Pub. No.: WO2018/104072
PCT Pub. Date: Jun. 14, 2018

(65) Prior Publication Data
US 2019/0308597 A1    Oct. 10, 2019

(30) Foreign Application Priority Data

Dec. 6, 2016 (DE) .................. 10 2016 014 485

(51) Int. Cl.
*B60T 11/20* (2006.01)
*B60T 7/04* (2006.01)
(Continued)

(52) U.S. Cl.
CPC .............. *B60T 11/20* (2013.01); *B60T 7/042* (2013.01); *B60T 8/326* (2013.01); *B60T 8/368* (2013.01); *F15B 7/08* (2013.01); *B60T 2270/82* (2013.01)

(58) Field of Classification Search
CPC .......... B60T 11/20; B60T 8/368; B60T 8/326; B60T 7/042; B60T 2270/82
See application file for complete search history.

(56) References Cited

U.S. PATENT DOCUMENTS

| | | |
|---|---|---|
| 4,824,186 A | 4/1989 | Leiber et al. |
| 8,063,627 B2 * | 11/2011 | Cagnac .................. B60T 7/042 |
| | | 324/207.2 |

(Continued)

FOREIGN PATENT DOCUMENTS

| | | |
|---|---|---|
| DE | 3723916 A1 | 1/1989 |
| DE | 3723842 A1 | 2/1989 |

(Continued)

OTHER PUBLICATIONS

International Search Report, Application No. PCT/EP2017/080316, dated Mar. 15, 2018.

*Primary Examiner* — Thomas E Lazo
(74) *Attorney, Agent, or Firm* — MacMilan, Sobanski & Todd, LLC (57) ABSTRACT

The disclosure relates to a main brake cylinder arrangement for a motor vehicle brake system, comprising: at least one piston, which can be displaced along a displacement axis (V) and, together with a housing arrangement, delimits a pressure chamber; a force input member, which is displaceable according to a brake pedal actuation and is coupled or can be coupled to the piston for common displacement; an elongated position encoder element, which is displaceable according to an actuation of the force input member; a detection unit, which is designed to detect a displacement of the position encoder element; and a receiving region, which is designed to receive the position encoder element at least in part. The ends of the position encoder element are each arranged in a different housing region (F, S), which is (Continued)

arranged in a fluid path between the first and second housing region (F, S).

15 Claims, 4 Drawing Sheets (51) Int. Cl.
*B60T 8/32* (2006.01)
*F15B 7/08* (2006.01)
*B60T 8/36* (2006.01)

(56) References Cited

U.S. PATENT DOCUMENTS

| | | |
|---|---|---|
| 9,266,517 B2 * | 2/2016 | Knechtges .............. B60T 11/16 |
| 9,315,180 B2 | 4/2016 | Jungbecker et al. |
| 9,446,753 B2 | 9/2016 | Feigel et al. |
| 9,797,416 B2 | 10/2017 | Giese et al. |
| 9,797,417 B2 * | 10/2017 | Giese ...................... B60T 11/20 |
| 2003/0000375 A1 | 1/2003 | Zumberge et al. |
| 2014/0331758 A1 | 11/2014 | Sim |
| 2015/0070003 A1 | 3/2015 | Elliott et al. |
| 2016/0272173 A1 | 9/2016 | Shin et al. |

FOREIGN PATENT DOCUMENTS

| | | |
|---|---|---|
| DE | 102008020934 A1 | 10/2009 |
| DE | 102010040097 A1 | 3/2011 |
| DE | 102012022519 A1 | 5/2014 |
| DE | 102012022520 A1 | 5/2014 |
| WO | 2009059619 A1 | 5/2009 |
| WO | 2013023953 A1 | 2/2013 |

* cited by examiner

MAIN BRAKE CYLINDER ARRANGEMENT HAVING A POSITION ENCODER ELEMENT AND A SEAL ARRANGEMENT

CROSS-REFERENCE TO RELATED APPLICATIONS

This application is the National Phase of International Application PCT/EP2017/080316 filed Nov. 24, 2017 which designated the U.S. and that International Application was published on Jun. 14, 2018 as International Publication Number WO 2018/104072 A1. PCT/EP2017/080316 claims priority to German Patent Application No. 10 2016 014 485.8, filed Dec. 6, 2016. The disclosures of both applications are incorporated herein by reference.

BACKGROUND OF THE INVENTION

The present disclosure relates in general to the technical field of main brake cylinder arrangements and in particular main brake cylinder arrangements for motor vehicle brake systems. More precisely, the present disclosure relates to a main brake cylinder arrangement in which a brake pedal actuation is detectable by means of a position encoder element.

Solutions for detecting a brake pedal actuation are known from the prior art. Such a detection is necessary, for example, to detect the presence of a driver's wish in respect of vehicle braking and if necessary also the desired degree of vehicle braking. This information can be used to determine the brake forces to be provided in driver-decoupled brake operation (brake-by-wire). Such brake forces are typically produced via an electromechanical brake actuator.

In this context it is further known to provide a position encoder element that is displaceable according to a brake pedal actuation, wherein this displacement is detected by means of a detection unit. Rod-shaped position encoder elements, for example, are possible for this, which are coupled to the piston of a main brake cylinder for a common displacement.

Examples of this are found in the documents DE 10 2008 020 934 A1, DE 37 23 842 A1 or DE 37 23 916 A1.

The provision of additional displaceable position encoder elements within the main brake cylinder arrangement and an often electrically operated detection unit increases the risk of malfunctions, however.

SUMMARY OF THE INVENTION

A main brake cylinder arrangement is to be specified that permits more reliable detection of a brake pedal actuation.

For this a main brake cylinder arrangement for a motor vehicle brake system is provided, comprising the following:
  at least one piston, which is displaceable along a displacement axis and confines a pressure chamber together with a housing arrangement;
  a force input member, which is displaceable in accordance with a brake pedal actuation and is coupled or couplable to the piston for a common displacement;
  an elongated position encoder element, which is displaceable in accordance with an actuation of the force input member;
  a detection unit, which is configured to detect a displacement of the position encoder element; and
  a receiving region, which is configured to receive at least a section of the position encoder element.

Here a first end of the position encoder element is arranged in a first housing region of the main brake cylinder arrangement and the detection unit is arranged in a second housing region of the main brake cylinder arrangement, and the receiving region connects the first and second housing regions to one another. The main brake cylinder arrangement further comprises at least one first seal arrangement, which is arranged in a fluid path between the first and second housing region.

The piston can be a pressure and/or brake piston, which is guided displaceably in a cylinder bore of the main brake cylinder arrangement. The housing arrangement can comprise a cylinder housing of the main brake cylinder arrangement. The piston and the cylinder bore (and/or the cylinder housing) can together confine the pressure chamber. According to a displacement of the piston, the volume of the pressure chamber can be varied, so that a pressure on the pedal counterforce simulator or, in the case of a system failure, directly a brake pressure in a hydraulic brake circuit coupled to the main brake cylinder arrangement can be varied in a known manner.

It is understood that the main brake cylinder arrangement can also comprise several such pistons, which are arranged, for example, according to a tandem design. These can also define a corresponding plurality of pressure chambers.

The force input member can be configured as a generally cylindrical element and/or in the manner of a piston. The coupling to the piston can be achieved frictionally (by caulking, for example, or common abutment). An at least indirect mechanical coupling can also take place to the brake pedal. The force input member can generally be displaceable likewise along the displacement axis, wherein it can translate a brake pedal actuation into a displacement of the piston along the displacement axis.

The position encoder element can be configured as a generally cylindrical element. According to one example, the position encoder element is substantially rod-shaped and is configured in particular with a rounded, oval or circular cross section, at least in part. Furthermore, the position encoder element can comprise a metal and in particular a magnetic material and/or generally be adapted to interact with the detection unit for a position recognition. The detection unit can comprise a magnetic field sensor for this purpose.

The position encoder element can be couplable or coupled to at least one piston or the force input member, in order to be displaced together with this. To this end carrier elements can be provided on the piston or the force input member, for example in the form of (e.g. radially) projecting regions and/or drive plates arranged on the piston or the force input member. The displacement of the position encoder element can likewise take place substantially along the displacement axis. In particular, the position encoder element can be displaced along an axis spaced at a distance from the displacement axis but parallel to it.

The detection unit can detect the movements of the position encoder element by means of a suitable sensor unit, for example a magnetic field sensor unit, comprising a Hall sensor. The detection unit can further be comprised by an electromechanical brake actuator unit or interact with this. In particular, the detection unit can be part of a sensor unit for detecting an operating parameter of the brake actuator unit, such as, for example, a current position of an electric motor of this unit. The detection unit can further be configured to generate signals according to the displacement of the position encoder element. These can be evaluated by a control unit. This control unit can be comprised by the detection unit or at least be connectable to this. The receiving region can comprise an elongated recess or hole, which can have a substantially oval or circular and/or preferably closed cross section, at least in part. The receiving region can extend along a longitudinal axis of the position encoder element. In particular, a longitudinal axis of the receiving region can run substantially parallel to the longitudinal axis of the position encoder element or coincide with this. The longitudinal axis can additionally or alternatively run parallel to the displacement axis of piston and/or force input member. The position encoder element can be taken up in the receiving region guided displacably, for example via a guide bush inserted into the receiving region.

The first housing region can receive and/or enclose, at least partially, the first end of the position encoder element. The first end can be an end of the position encoder element coupled to the piston and/or to the force input member. Accordingly the piston and/or the force input member can be received, likewise at least partially, in the first housing region in a brake-inactive position.

The first and second housing region can be configured respectively in one part or multiple parts and in particular also comprise one or more common housing parts. The housing regions can be configured at least partially in a substantially solid main cylinder housing, which is produced by casting, for example. This main cylinder housing can also be configured in one or multiple parts. The first and the second housing region can further each define regions which confine defined working spaces or chambers, for example, and/or in which the elements of the main brake cylinder arrangement respectively associated with them can be received.

According to one embodiment, the first housing region comprises a main housing part and a cover or cylinder section fastened thereon. This cover section can comprise an input opening for the force input member and axially span the force input member at least partially, at least in a brake-inactive position. The main housing part can be configured on the contrary to be substantially solid and comprise a section of the cylinder bore, for example.

The first housing region can further comprise an input chamber, which is sealed fluidically by the pressure chamber, and into which the first end of the position encoder element protrudes. Starting out from this input chamber, the receiving region can extend to the second housing region.

The second housing region can, in addition to the detection unit, also receive a second end of the position encoder element, which interacts with the detection unit. In particular, an interaction region can be arranged between the second end of the position encoder element and the detection unit in the second housing region.

It is generally understood that the receiving region and the first and second housing region can also overlap one another at least partially. Furthermore, the second end of the position encoder element can also be arrangeable, depending on the current position of the brake pedal, at least temporarily in the receiving region, in order then to be displaced into the second housing region. Thus it can be provided that the receiving, described above, of the first and second end of the position encoder element in the respective first and second housing regions is provided at least in a brake-inactive resting position of the main brake cylinder arrangement.

The receiving region can form a connecting duct between the first and second housing region. The receiving region can thus form the fluid path between the housing regions at least in part and/or extend along this. In particular, the receiving region can provide a fluid-conductive connection between these housing regions, which connection can be targetedly interrupted, however, by means of the first seal arrangement.

The fluid path can comprise a free space, duct, fluid-conductive region or similar, via which (for example in the absence of the first seal arrangement) fluids are exchangeable between the housing regions.

The first seal arrangement can generally comprise a sealing ring (e.g. O-ring), a lip seal and/or a shaft seal or be configured as such an element. The seal arrangement can thus also comprise only a single such sealing element. The seal arrangement can be configured to seal the first and second housing region fluidically from one another. This can relate to an at least proportional fluidic sealing (for example, in cooperation with other seal arrangements) but also a substantially complete sealing (for example independently of other seal arrangements).

The fluidic sealing can take place in particular in such a way that (at least up to reaching a possible threshold pressure) an air exchange is prevented and/or a leakage volume of brake fluid entering the first housing region over time does not get into the second housing region. Additionally or alternatively, however, the first seal arrangement can provide a sealing effect between at least the second housing region and the environment. However, even this sealing effect can be selectively interrupted, for example to provide a ventilation function explained below.

The first seal arrangement can be adapted to withstand a predetermined threshold pressure. Only after exceeding this predetermined threshold pressure can the first seal arrangement yield and permit a fluidic connection or overflow. This can relate in particular to a fluidic connection of the housing regions via the receiving region.

The first seal arrangement is arranged in the receiving region. In addition or alternatively, the first seal arrangement can interact in a sealing manner with the position encoder element and/or an element receiving or guiding the position encoder element. This element can be a sleeve, explained below.

In summary, the first seal arrangement can be configured to prevent a fluidic connection of the first and second housing region via the receiving region and/or a fluidic connection between the second housing region and the environment. In other words, the first seal arrangement can be arranged and configured in such a way that substantially no fluids and/or no air can be exchanged between the housing regions via the receiving region and in particular no fluids can pass from the first to the second housing region. This sealing effect can be maintained at least up to a predetermined threshold pressure.

According to a further development, the first and second housing region are configured at least partially in separate first and second housing parts. In other words, the first and second housing region can each comprise at least one housing part, which is not associated with the respectively other housing region or is comprised by this. The housing parts can be formed by separately manageable elements or assemblies, which can be combined, for example, and/or attached to one another. The housing parts can together form a housing arrangement of the hydraulic cylinder arrangement, at least for the most part or substantially completely. The housing parts can further be divided into multiple parts. In this context, however, the housing parts can each comprise a largest-volume main housing part, which is manufactured by casting, for example.

In summary, a first housing part can thus be provided that forms the first housing region at least partially, for the most part or substantially completely. The first housing part can confine an input chamber for the force input member, for example, comprise a coupling region between the force input member and the piston and/or receive the first end of the position encoder element. The second housing part can conversely form the second housing region at least partially, for the most part or substantially completely. Furthermore, the detection unit can be received herein and optionally also at least a portion of the second end of the position encoder element.

According to a further development, the first seal arrangement is configured to connect the second housing region in a fluid-conductive manner to the environment once a threshold pressure is exceeded. In particular, a connection conducting gas or air via this can be provided. In this case in particular a fluid-conductive connection of an interior space of the second housing region to the environment can further be provided. For example, an inner receiving region of the second housing region, which is used to receive the detection unit, can be connected in an air-conductive manner to the environment.

As a result, a selective ventilation function of the second housing region can thus be provided, in particular in the case of overpressure occurring therein. The selective fluid-conductive connection once the threshold pressure is exceeded can be achieved, for example, in that a sealing lip of the first seal arrangement maintains its sealing function only up to the threshold pressure and then yields (for example, by folding down). If the pressure falls below the threshold pressure again, on the other hand, the seal arrangement can be configured to provide its sealing effect again.

In this context it can further be provided that the fluid-conductive connection to the environment takes place via a ventilation duct. The ventilation duct can be connected in a fluid-conductive manner to the first seal arrangement and/or the environment. The ventilation duct can comprise a hole, a gap and/or an elongated recess.

According to one variant, the ventilation duct is confined by at least one of the housing parts discussed above. For example, the housing parts can comprise an interface region, wherein the ventilation duct is configured within this interface region and/or is enclosed or confined by this. The interface region can be formed, for example, in an end face of at least one of the housing parts or be confined by this, wherein the end face can abut the other housing part. The end face and a correspondingly opposing region of the other housing part can thus together confine the ventilation duct, at least proportionally.

The first seal arrangement can be received in a recess, wherein the recess is connected in a fluid-conductive manner to the ventilation duct. The recess can provide a receiving region for the first seal arrangement. The ventilation duct can lead directly into the recess or, expressed another way, extend starting out from this. The recess can be configured in the housing arrangement of the main brake cylinder arrangement. In particular, the recess can be provided in at least one of the housing regions and/or housing parts discussed above. At a higher level, the recess can further be connected to the receiving region or be comprised by this.

No later than after a selective fluid-conductive connection, for example due to overflowing of the first seal arrangement once a threshold pressure is exceeded, air can thus flow from the second housing region via the first seal arrangement into the recess and from here via the ventilation duct into the environment.

Another variant provides that the main brake cylinder arrangement further comprises a second seal arrangement, which is configured to seal the first and second housing region fluidically from one another. This can relate to an at least proportional fluidic sealing (for example in cooperation with further seal arrangements), but also substantially complete sealing (for example, substantially independently of other seal arrangements). The second seal arrangement can again comprise an O-ring, a lip seal and/or a shaft seal or be configured as such a (in particular individual) seal element. Moreover, unless otherwise specified, all of the above- and below-named features, alternatives and further developments with regard to the first seal arrangement also apply to the second seal arrangement.

The second seal arrangement can further interact directly with an outer circumferential surface of the position encoder element and, in particular, rest thereon. Furthermore, the second seal arrangement can generally be received in the receiving region and/or in a sleeve, which is explained below. Starting out from the first housing region and seen in the direction of the second housing region, the second seal arrangement can further be upstream of the first seal arrangement.

The first and second seal arrangement can be part of a seal system between the two housing regions and in particular within the receiving region. The seal system can also comprise further seal arrangements, for example a third seal arrangement explained below.

The second seal arrangement can be designed to withstand a greater pressure than the first seal arrangement. In other words, a threshold pressure up to which the second seal arrangement can maintain its sealing effect can exceed a threshold pressure of the first seal arrangement. It can thus be provided, for example, that after reaching a predetermined threshold pressure, only the first seal arrangement loses its sealing effect, but not the second. In particular, it can be provided that the first seal arrangement provides the described ventilation function to the environment after a predetermined overpressure has arisen in the second housing region, but the second seal arrangement maintains its sealing effect. It can be facilitated hereby that air from the second housing region escapes into the environment but not into the first housing region.

According to a further development, the second seal arrangement is arranged in a housing part comprising the first housing region and the first seal arrangement is arranged in a housing part comprising the second housing region. Expressed another way, the first seal arrangement, over which a selective flow can preferably take place for the purpose of ventilation, can be arranged closer to the second end of the position encoder element interacting with the detection unit than the second seal arrangement (and/or closer to the detection unit as such). The second seal arrangement, on the other hand, can be arranged closer to the first end of the position encoder element and/or the force input member than the first seal arrangement. The proximity can relate in this case respectively to a distance along a displacement axis or longitudinal axis of the receiving region.

On a higher level, the first seal arrangement can thus provide an in particular sealing effect between the second housing region and the environment. This can be in particular an air-sealing effect. However, at least up to reaching a threshold pressure, the first seal arrangement can also provide a sealing effect between the two housing regions. The second seal arrangement can conversely provide in particular a sealing effect between the first and second housing region. This can be in particular a fluid-sealing effect. On the other hand, the second seal arrangement can be arranged outside a fluidic connection path between the second housing region and the environment, thus provide no significant air-sealing effect between these regions, for example.

The main brake cylinder arrangement can further comprise at least a further, third seal arrangement. This can also seal the first and second housing region off from one another fluidically. The third seal arrangement can likewise be arranged in the receiving region. In addition or alternatively the third seal arrangement can be arranged, viewed along the displacement axis or the longitudinal axis of the receiving region, between the first and second seal arrangement. According to one variant the third seal arrangement is configured as an O-ring, whereas the first and second seal arrangement are configured as lip seals.

A further development provides that the first seal arrangement (and optionally also the second and/or the third seal arrangement) is arranged on a sleeve. The sleeve can be arranged at least partially in the receiving region. As explained below, the sleeve can also receive the position encoder element, at least in part, and optionally also provide a guide effect during the displacement of the position encoder element. In this case the sleeve or at least a sliding sleeve comprised hereby can also rest directly on an outer circumferential surface of the position encoder element (e.g. by way of an inner circumferential surface of the sleeve or sliding sleeve). Such an indirect or direct resting of the sleeve on the position encoder element is not mandatory, however. The sleeve can generally also be termed a guide sleeve or guide bushing. The sleeve can further be configured elongated and, for example, generally as a hollow cylinder. A longitudinal axis of the sleeve can run parallel to the displacement axis and/or a longitudinal axis of the receiving region and also coincide with the latter.

The first seal arrangement can be arranged on an outer circumferential surface of the sleeve. The outer circumferential surface of the sleeve can comprise at least one diameter stage. This can be used to secure the position of the sleeve in the receiving region and/or as a contact surface, for example for one of the seal arrangements. The sleeve can further comprise a through-hole, through which the position encoder element can be guided, for example. The through-hole can comprise an inner circumferential surface on which the second seal arrangement, for example, is arranged. A possible third seal arrangement, for example in the form of an O-ring, can be arranged, on the other hand, on the outer circumferential surface of the sleeve. The through-hole can generally be formed by the hollow-cylindrical design of the sleeve, thus provided even without separate cutting machining steps, for example, or even drilling processes, which is likewise entirely possible, however.

According to another variant the sleeve extends through both housing parts. In particular, the sleeve can be configured to be inserted into one of the two housing parts and to be introduced into the respectively other housing part in the context of connecting the housing parts. The sleeve can comprise a suitable structure for this, in order to limit an insertion depth into at least one of the two housing regions, for example. This structure can be in the form of a diameter stage.

The sleeve can generally bridge or span a boundary region between the housing parts, in particular when the sleeve is received in the receiving region. It can also comprise at least one section per housing part that extends into the corresponding housing part.

The sleeve can further comprise a fluid duct, which extends from a region of the sleeve facing the second housing region at least up to the first seal arrangement. The fluid duct can provide a fluid-conductive connection. According to one variant the fluid duct forms a region of the sleeve through which or along which a fluid and in particular air can flow from the first housing region to the second seal arrangement. The fluid duct can comprise a depression, a recess, a hole and/or a groove.

According to one variant, the fluid duct is configured at least partially on an outer circumferential surface of the sleeve. In addition or alternatively the fluid duct can be configured to be helically formed and/or spiral and/or helical, at least in part. In this case the fluid duct can pass around a circumferential surface of the sleeve several times in a circumferential direction while it extends axially to the first seal arrangement. According to one variant the fluid duct extends as an elongated groove or depression in a helical manner along the outer circumferential surface and thereby provides a fluid-conductive duct to the first seal arrangement.

A further development provides that an end region of the fluid duct extends into at least one of the receiving region and the second housing region. This can be accompanied by a fluid-conductive connection between the fluid duct and the receiving region and/or the second housing region. The end region can be a free end region facing away from the first seal arrangement. Starting from this end region, air can flow to the seal arrangement, wherein this can be in particular air from the second housing region.

The sleeve can further comprise at least one sliding section along which the position encoder element is guided displaceably. The sliding section can directly adjoin an outer circumferential surface of the position encoder element. The sliding section can comprise a friction-reducing material and in particular a friction-reducing coating. For example, the sliding section can comprise a Teflon material or a Teflon coating. The sliding section can be provided in a separate sliding element, for example in a sliding sleeve or slide bushing. The sliding element can be inserted in the sleeve, in particular in a possible through-hole of this. According to one variant the sleeve comprises at least two sliding elements, which are spaced axially at a distance from one another along the longitudinal axis of the sleeve and/or receiving region.

Various aspects of this invention will become apparent to those skilled in the art from the following detailed description of the preferred embodiment, when read in light of the accompanying drawings.

DETAILED DESCRIPTION OF THE INVENTION

Figure 1:
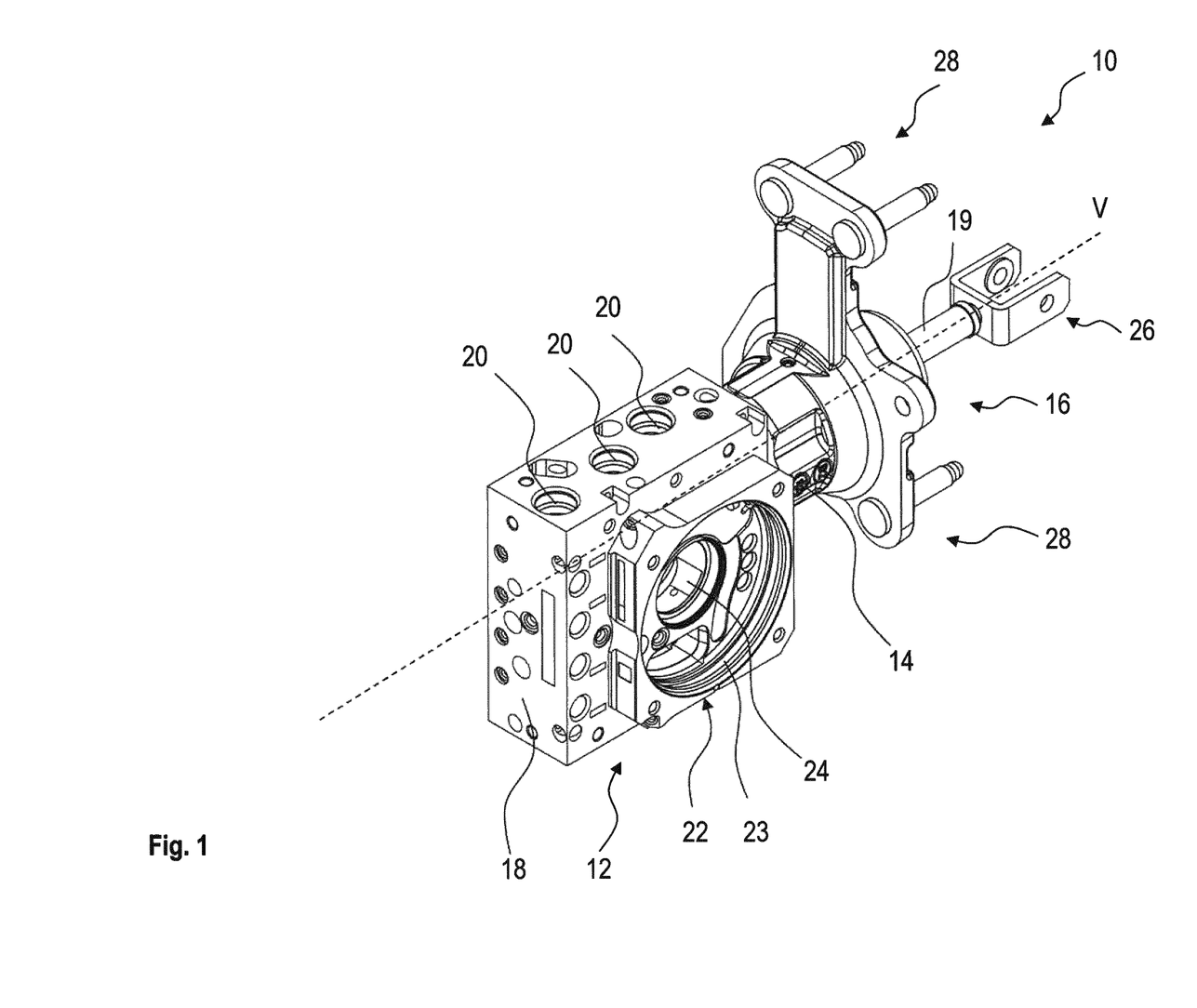
FIG. 1 is a perspective overall view of a main brake cylinder arrangement according to the invention according to an exemplary embodiment.

FIG. 1 shows a main brake cylinder arrangement 10 according to an exemplary embodiment. The main brake cylinder arrangement 10 comprises a housing arrangement 12, which receives a piston arrangement 40 explained below (see FIG. 2). In the exemplary embodiment shown, the housing arrangement 12 comprises a first housing part 14, which is configured cylindrically in part and provides an input region 16 for a force input member 19. The first housing part 14 is configured as a separately manageable element from a second housing part 18, but is screwed fixedly to this. The second housing part 18 is configured substantially in the form of a block and proportionally limits a pressure chamber 17, explained below, of the piston arrangement 40 (see FIG. 2). The second housing part 18 further comprises a plurality of holes 20. These are used to connect the main brake cylinder arrangement 10 to a brake fluid reservoir (not shown) in a known manner.

The second housing part 18 further comprises a coupling region 22 for coupling the main brake cylinder arrangement 10 to an electromechanical brake actuator unit, which is not depicted. The second coupling region 22 specifically comprises a screwing region 23, which is dimensioned with a comparatively large diameter and into which a corresponding screwing region of an electric motor can be screwed, which drives an electromechanical brake actuator unit connected downstream. The electromechanical brake actuator unit further acts in a known manner on both brake circuits to operate the connected wheel brakes in accordance with the extent desired by the driver.

In the event of a system failure, the possibility remains of generating brake pressures in a motor vehicle brake system via the various pressure chambers of the main brake cylinder arrangement 10, as is known, for example, from the documents WO 2013/23953 and DE 10 2010 040097 A1.

In FIG. 1 it is also recognised that the force input member 19 is configured as a multipart piston-shaped element. At its end facing away from the first housing part 14 the force input member 19 comprises a coupling section 26 for coupling to a brake pedal, which is not depicted. As will be explained in detail below, the force input member 19 is further displaceable along a displacement axis V relative to the housing arrangement 12 and in particular is insertable into and withdrawable from the first housing part 14.

Finally FIG. 1 shows several attachment regions 28 for attaching the main brake cylinder arrangement 10 in the engine compartment of a vehicle (not shown).

Figure 2:
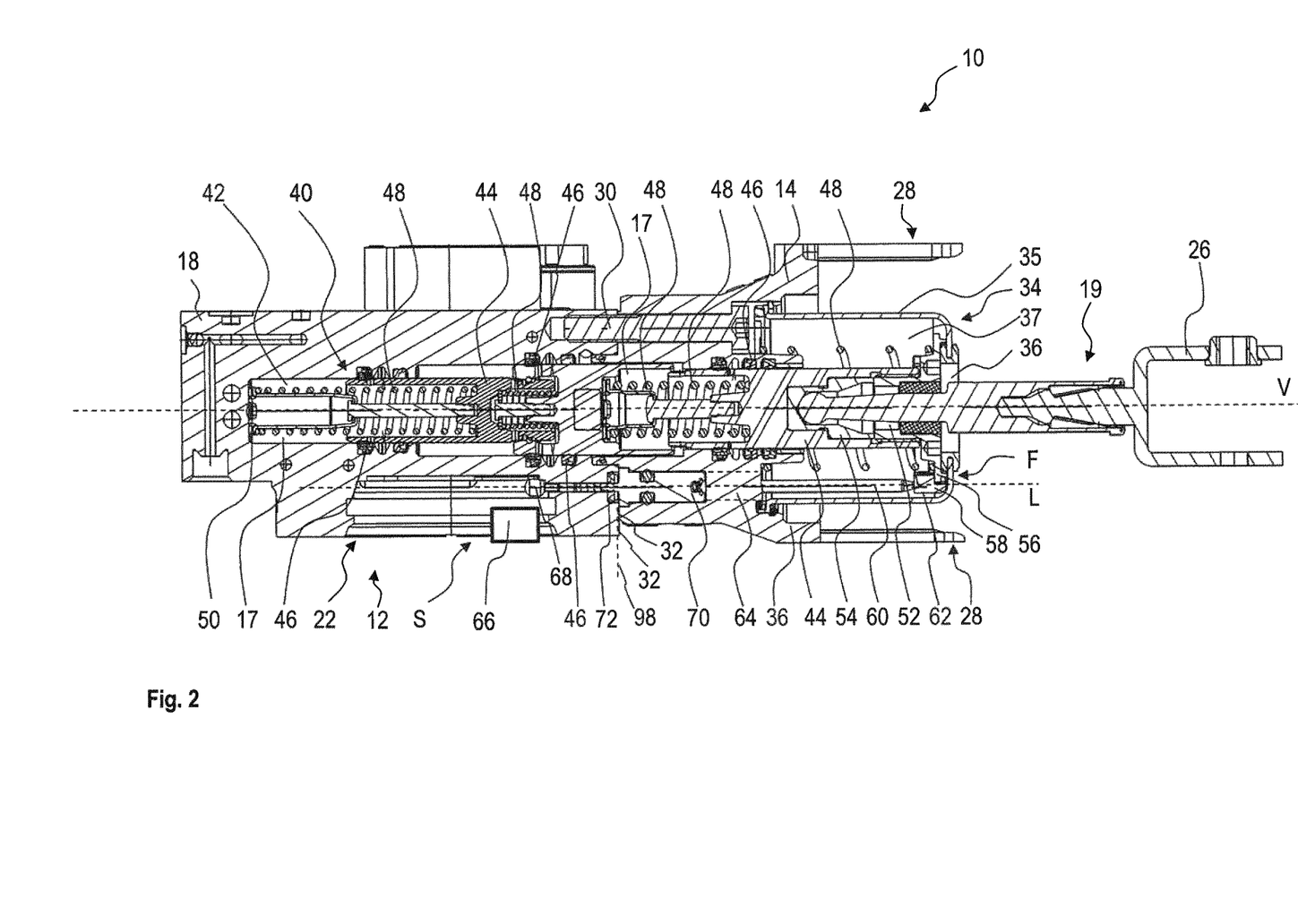
FIG. 2 is a sectional view through the main brake cylinder arrangement from FIG. 1.

FIG. 2 shows a sectional view through the main brake cylinder arrangement 10 from FIG. 1. The position of the section plane becomes clear from the orientation of the coupling section 26, wherein the section plane further contains the displacement axis V. The attachment regions 28 of the main brake cylinder arrangement 10 are not fully illustrated here.

The two-part construction of the housing arrangement 12 is again evident from FIG. 2. The first housing part 14 is recognised in detail and is configured separately from the second housing part 18 but is screwed to this via at least one screw bolt 30. The first and second housing part 14, 18 abut one another via end faces 32 facing one another. The end faces 32 each form an interface region of the first and second housing part 14, 18, via which the housing parts 14, 18 can be connected to one another. The end faces 32 thus also represent an interface region of the entire housing arrangement 12 of the main brake cylinder arrangement 10.

The first housing part 14 is constructed in multiple parts and has a cover section 34 at its end facing the coupling section 26 of the force input member 19. This is formed by a cover element 35, which is configured separately from a solid main housing element 36 of the first housing part 14, which element is manufactured by casting. The main housing element 36 has the end face region 32 of the first housing part 14 and the cover element 35 and the main housing element 36 are attached to one another. The cover element 35 further comprises an input opening 36 for the force input member 19, wherein the input opening 36 surrounds the displacement axis V. The cover element 35 spans both a section of the force input member 19 and a right-hand piston 44, explained below, of a piston arrangement 40. In this case the cover element 35 defines an input chamber 37, via which the force input member 19 enters the housing arrangement 12 and within which the force input member 19 is coupled to the piston arrangement 40.

In FIG. 2 a piston arrangement 40 is also recognised. This comprises an elongated cylinder bore 42, which extends along the displacement axis V through both housing parts 14, 18. Taken up in the cylinder bore 42 are two pistons 44, which each confine a pressure chamber 17 with the cylinder bore 42. The pistons 44 are displaceable inside the cylinder bore 42 along the displacement axis V, so that the volume of the respectively associated pressure chambers is variable. Pressures can be generated via this and transmitted to the associated pedal counterforce simulators (brake-by-wire) via pressure circuits, which are not shown and are connected to the respective pressure chambers 17, or in the event of a system failure can be transmitted directly to the brake circuits of a vehicle.

It is further recognised in FIG. 2 that the pistons 44 are taken up in the cylinder bore 42 via several seals 46. For reasons of depiction, however, only selected seals 46 are provided with a corresponding reference sign.

It is further recognised that the piston arrangement 40 comprises several reset springs 48, by means of which the pistons 44 are supported on one another and on a cylinder base 50 of the cylinder bore 42. The pistons 44 are pretensioned in their starting position or, in other words, brake-inactive resting position shown in FIG. 2 via these reset springs 50. To generate a pressure, the pistons 44 are moved on the other hand along the displacement axis V in FIG. 2 to the left, thus in the direction of the cylinder base 50. The piston arrangement 40 is accordingly configured overall in a known manner according to the tandem cylinder design.

The force input member 19 extends through the input opening 36 into an axial blind hole 52 in the right-hand piston 44 in FIG. 2. There an end of the force input member 19 facing the piston 44 is staked with a receiving sleeve 54 of the right-hand piston 44. A displacement movement of the force input member 19 is consequently transferable to the right-hand and via the reset springs 48 also to the left-hand piston 44 from FIG. 2.

A drive plate 56 is also screwed into the blind hole 52. This has a larger outer diameter than the right-hand piston 44. Arranged between the drive plate 56 and an opposing end face region of the main housing element 36 is another reset spring 48. This receives the right-hand piston 44 substantially coaxially and extends along the displacement axis V. In a displacement of the piston 44 in FIG. 2 to the left, this reset spring 48 is also compressed and thus supports a return movement of the piston arrangement 40 to the starting position shown in FIG. 2.

The drive plate 56 has a coupling section 58, via which it is coupled to a rod-shaped position encoder element 60. The position encoder element 60 has a longitudinal axis L, which extends parallel to the displacement axis V. The position encoder element 60 further has a substantially circular cross section with a varying diameter in the end regions. The coupling of the position encoder element 60 to the coupling arrangement 58 is accomplished via a first end 62 of the position encoder element 60, wherein this first end 62 is connected to the coupling section 58 of the drive plate 56 via a latching connection.

The position encoder element 60 extends, starting from the drive plate 56, through the input chamber 37 into a receiving region 64. This comprises an elongated hole, which extends along the longitudinal axis L of the position encoder element 60 and thus parallel to the displacement axis V. The precise extension of the receiving region 64 is only partially evident in FIG. 2 and depicted by dashed lines in part. However, further details in this regard result from the following figures.

The receiving region 64 extends through both housing parts 14, 18 and leads in the second housing part 18 into the coupling region 22 for the electric motor, which is not depicted. Also arranged in this coupling region 22 is a detection unit 66 (rotation sensor), which encloses only the drive shaft of the electric motor and comprises a magnetic field sensor (not shown).

It is recognised that a second end 68 of the position encoder element 60 protrudes from the receiving region 64 and is likewise arranged in the second housing part 18. This second end 68 is used for the mechanical coupling to the detection unit 66, in particular for converting a linear into a rotary movement of the detection device.

In summary, it is thus possible to detect movements of the position encoder element 60 by means of the detection unit 66. On account of the coupling to the piston arrangement 40 and to the force input member 19 via the drive plate 56, these movements of the position encoder element 60 indicate a brake pedal actuation by the driver. Expressed another way, a brake pedal actuation is accompanied by a displacement of the force input member 19 and of the piston arrangement 40 coupled thereto to the left in FIG. 2 along the displacement axis V. At the same time the position encoder element 60 is also moved to the left according to this displacement, wherein the shift of the second end 68 along the displacement axis V is detected by the detection unit 66. This information can be evaluated in a known manner by control units, which are not shown, in order to deduce the presence and the extent of a braking desire of the driver and to activate the electromechanical brake actuator unit according to this.

The embodiment shown is further characterised in that the first end 62 of the position encoder element 60 is arranged in a first housing region F, which is comprised by the first housing part 14. The same applies to at least a section of the force input member 19 and the right-hand piston 44 in FIG. 2, wherein the latter is displaceable also into the second housing part 18 as a result of a brake actuation.

The second end 68 of the position encoder element 60 is arranged, on the other hand, in a second housing region S, which is comprised by the second housing part 18. This second housing region S further comprises the detection unit 66 and an interaction region between the detection unit 66 and the second end 68 of the position encoder element 60. In summary, the position encoder element 60 extends starting from both housing regions F, S through both housing parts 14, 18, wherein the housing regions F, S are connected by the receiving region 64.

Following the installation of the electric motor, the second housing region S further forms a chamber that can be substantially insulated from the environment, in which the detection unit 66 is arranged.

As is apparent from FIG. 2, a further element in the form of a sleeve 70 (in the following: guide sleeve 70) likewise extends through both housing parts 14, 18. The guide sleeve 70 receives the position encoder element 60 in part and provides a guide effect during the displacement of the position encoder element 60. The arrangement of the position encoder element 60 inside the guide sleeve 70 is only partially recognisable on account of the position of section plane in FIG. 2, but becomes clear from the following figures.

On the other hand, a first seal arrangement 72, which is arranged on an outer circumferential surface of the guide sleeve 70, is recognisable in FIG. 2. This seal arrangement 72 seals the second housing region F, S fluidically from the environment, but also provides a sealing effect along the receiving region 64, so that no air or fluids, for example, are exchangeable via the receiving region 64 between the housing regions F, S.

In the context of the example shown, the sealing effect is relevant in particular to the effect that additional protection of the detection unit 66 and thus a reliable brake actuation detection can be provided hereby over a long service life of the main brake cylinder arrangement 10. More precisely, it was recognised according to the present embodiment that leakages of brake fluid can occur via the seals 46 into the input chamber 37, in particular after a longer operating duration. However, it is prevented by means of the first seal arrangement 72 of the guide sleeve 70 and in particular by means of the other seal arrangement 92, 94 explained below that this brake fluid gets to the detection unit 66 via the receiving region 64 and damages it.

Figure 3:
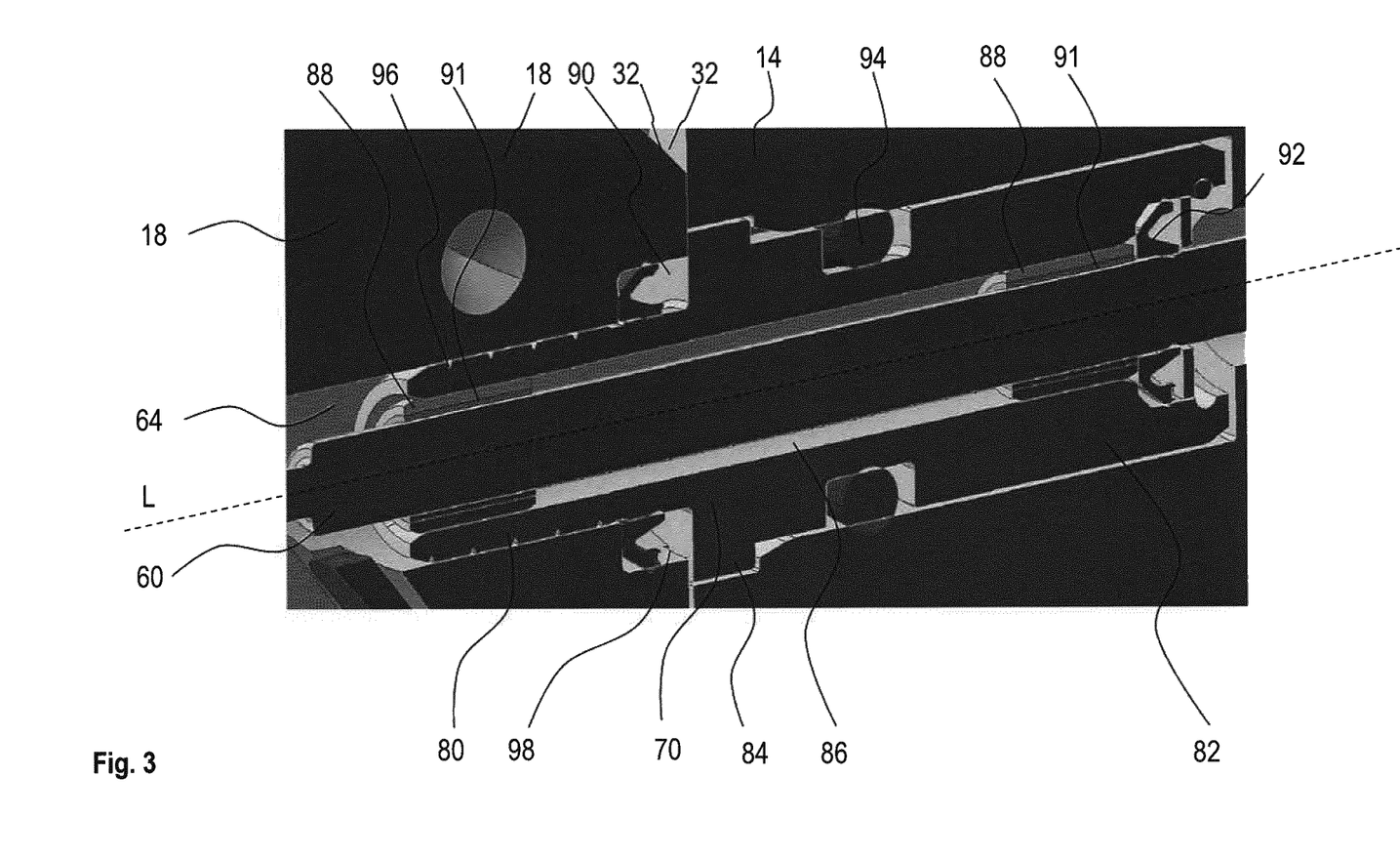
FIG. 3 is a detailed view of the guide sleeve according to the exemplary embodiment.
Figure 4:
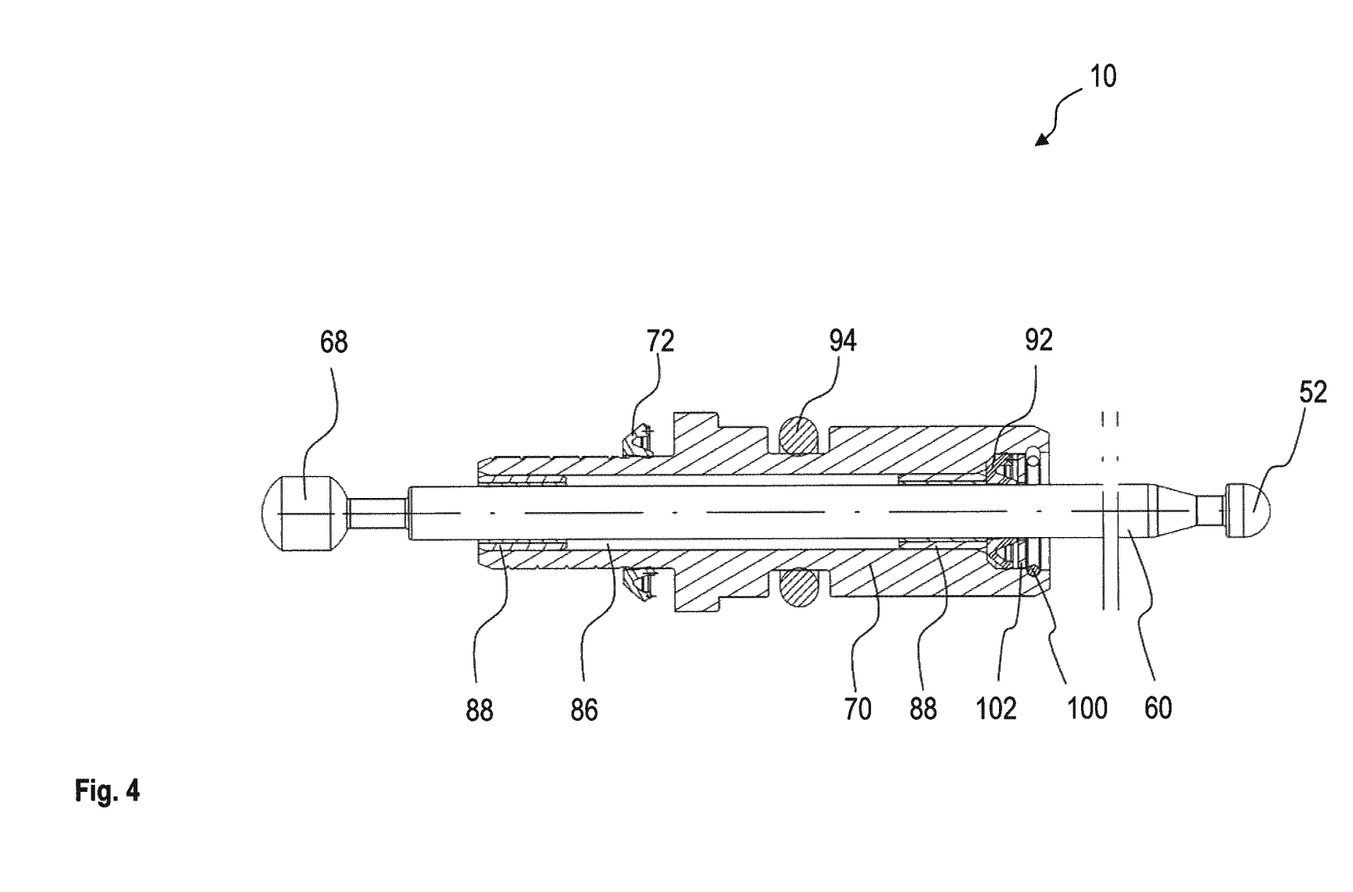
FIG. 4 is a component detail of guide sleeve and position encoder element in a sectional representation.

The design of the guide sleeve 70 is explained in greater detail below by means of FIGS. 3 and 4. FIG. 3 depicts a detailed view of the sectional view of FIG. 2 in the area of the guide sleeve 70, whereas FIG. 4 shows the guide sleeve 70 and the position encoder element 60 as a sectional representation in a component view.

In these figures the elongated extension of the guide sleeve 70 along the longitudinal axes L of the position encoder element 60 and of the receiving region 64 is first recognised again. The interface region of the housing arrangement 12 is further recognised, which is defined by the end faces 32 of the two housing parts 14, 18. The guide sleeve 70 comprises a left-hand section 80 in FIG. 3, which is arranged in the second housing part 18, and a right-hand section 82 in FIG. 3, which is arranged in the first housing part 14. The guide sleeve 70 is further configured substantially cylindrically, wherein an outer diameter varies along the length of the guide sleeve 70 on account of several diameter stages.

More precisely, the guide sleeve 70 comprises a main diameter stage 84, which defines a greatest outer diameter of the guide sleeve 70. At the same time the main diameter stage 84 provides a stop, via which an insertion depth of the guide sleeve 70 into the receiving region 64 and in particular into the first housing part 14 is limited. The second housing part 18 can then be pushed over the left section 80 of the guide sleeve 70 initially protruding from the first housing part 14 until the end faces 32 come into contact.

The guide sleeve 70 further has a through-hole 86, which extends axially along the longitudinal axis L through the guide sleeve 70. The position encoder element 60 is guided through this hole 86 and is received in this. Also arranged in the through-hole 86 are two slide bushings 88, which are spaced axially from one another and comprise a sliding coating 91. The sliding coating 91 adjoins an outer circumferential surface of the position encoder element 60, so that the position encoder element 60 is guided movably relative to the fixed guide sleeve 70 with reduced friction forces.

Also arranged on the outer circumferential surface of the left-hand section 80 of the guide sleeve 70 is the first seal arrangement 72. This is received in a recess 90 in the first housing part 18, which is comprised by the receiving region 64. The recess 90 extends up to the end face 32 of the second housing part 18 and merges into this.

In the lower area of FIG. 3 it is recognised that starting out from the recess 90, the end face 32 of the second housing part 18 comprises a stepped-back region, which forms a defined gap between the end faces 32 of the two housing parts 14, 18. A ventilation duct 98 is provided hereby, which provides a fluid-conductive connection of the recess 90 to the environment. An approximate progression of the ventilation duct 98 is also indicated in FIG. 2 by a dashed line.

As described above, the first seal arrangement 72 is provided primarily to decouple the second housing region S from the environment. In principle, however, the first seal arrangement 72 is also configured to seal the first and second housing region 14, 18 fluidically from one another. More precisely, an overflow of the guide sleeve 70 along its outer side is prevented and thus a transfer of fluid or air from the first to the second housing region 14, 18 via the receiving region 64 is prevented.

This is additionally supported by a second seal arrangement 92, which is received in the through-hole 86 of the guide sleeve 70 and rests on an outer circumferential surface of the position encoder element 60. The second seal arrangement 92 reduces the risk that fluid passes along the outer circumferential surface of the position encoder element 60 through the guide sleeve 70 into the second housing region 18.

Finally, the guide sleeve 70 comprises a third seal arrangement 94, which is arranged in a circumferential groove in the outer circumferential surface of the guide sleeve 70. This also provides a fluidically sealing effect, in order to prevent a fluid overflow via the outer circumferential surface of the guide sleeve 70.

In an overview it is further recognised that the first and second seal arrangements 72, 92 are configured as lip seals, whereas the third seal arrangement 94 is provided in the form of an O-ring. The second and third seal arrangements 92, 94 are also arranged in the first housing part 14 and close to the first housing region F. On the other hand, the first seal arrangement 72 is arranged in the second housing part 18 and close to the second housing region S. Starting from the first housing region F and viewed along the longitudinal axis L in the direction of the second housing part 18, the second seal arrangement 92 is thus arranged before the third seal arrangement 94, wherein the third seal arrangement is arranged in turn before the first seal arrangement 72.

In the left-hand section 80 of the guide sleeve 70, which generally faces the detection unit 66, which is not shown in FIG. 3, a fluid duct 96 is also configured, which acts as an air duct. The fluid duct 96 is provided as a helical groove along the outer circumferential surface of the guide sleeve 70. This groove passes multiple times around the outer circumferential surface in a circumferential direction and further runs axially in the direction of the first seal arrangement 72.

The fluid duct 96 provides a gap through which the air from the second housing region S is conducted via the receiving region 64 to the first seal arrangement 72. The first seal arrangement 72 is configured to withstand a corresponding air pressure in the second housing region S, which acts via the fluid duct 96 also on the first seal arrangement 72, only up to a predetermined threshold value. If this threshold value is exceeded, the first seal arrangement 72 yields, so that air from the second housing region S can flow over the first seal arrangement 72. This air can consequently pass via the recess 90 into the ventilation duct 98 and be conducted via this into the environment.

As a result the second housing region S can thus be selectively ventilated if an overpressure exceeding the threshold value occurs. As soon as this falls below the threshold value again, however, the first seal arrangement 72 regains its sealing effect, so that the air-conductive connection to the environment is interrupted.

The second and third seal arrangement 92, 94, on the other hand, are designed to withstand a higher threshold value and pressure than the first seal arrangement 72. These are thus designed to maintain their sealing function even in the event of an overpressure in the second housing region S while parallel to this a selective overflow of the first seal arrangement 72 can take place.

The ventilation function of the present exemplary embodiment represents an additional measure to safeguard the reliability of the position detection. For example, damage to the detection unit 66 is also avoided hereby that could otherwise arise in the event of an overpressure occurring in the second housing region S.

In conclusion reference is made to FIG. 4, which shows a further sectional representation of the guide sleeve 70 together with the position encoder element 60 received therein. The slide bushings 88 taken up in the through-hole 82 are again recognised. The arrangement and position of the seal arrangements 72, 92, 94 likewise becomes clear. These are formed in each case only by a single sealing element. Together they also form a seal system, which is arranged on the guide sleeve 70.

It is further recognised that the axial position of the second seal arrangement 92, which is arranged inside the through-hole 86, is secured by a securing ring 100 and shim 102. It is noted that the second seal arrangement 92 is arranged, starting out from the first housing region F and viewed in the direction of the second housing region S, ahead of the slide bushings 88. The slide bushings 88 are thus protected from contact with any leakage flows of brake fluid. This arrangement of the second seal arrangement 92 represents a separate aspect of the present disclosure independently of the other features of the exemplary embodiment.

Finally, the configuration of the first and second end 52, 68 of the position encoder element 60 becomes clear once more, wherein the end 68 is configured so that this can dip during installation into a coupling region on the detection element 66 in such a way that it can interact in a play-free manner with this on completion of the installation.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A main brake cylinder arrangement for a motor vehicle brake system, comprising:
   at least one piston which is displaceable along a displacement axis (V) and confines a pressure chamber together with a housing arrangement;
   a force input member which is displaceable in accordance with a brake pedal actuation and is coupled or couplable to the piston for a common displacement;
   an elongated position encoder element which is displaceable in accordance with an actuation of the force input member;
   a detection unit which is configured to detect a displacement of the position encoder element; and
   a receiving region which is configured to receive the position encoder element at least in part, wherein a first end of the position encoder element is arranged in a first housing region (F) of the main brake cylinder arrangement and the detection unit is arranged in a second housing region (S) of the main brake cylinder arrangement, wherein the receiving region connects the first and second housing regions (F, S) with one another, and wherein the main brake cylinder arrangement further comprises at least a first seal arrangement which is arranged in the receiving region and in a fluid path between the first and second housing region (F, S).

2. The main brake cylinder arrangement according to claim 1, wherein the first and second housing region (F, S) are configured at least partially in separate first and second housing parts.

3. The main brake cylinder arrangement according to claim 1, wherein the first seal arrangement is configured to connect the second housing region (S) in a fluid-conductive manner to the environment once a threshold value has been exceeded.

4. The main brake cylinder arrangement according to claim 3, wherein the fluid-conductive connection to the environment takes place via a ventilation duct.

5. The main brake cylinder arrangement according to claim 4, wherein the ventilation duct is confined by at least one of the two housing parts.

6. The main brake cylinder arrangement according to claim 4, wherein the first seal arrangement is received in a recess, which is connected in a fluid-conductive manner to the ventilation duct.

7. The main brake cylinder arrangement according to claim 1, wherein the main brake cylinder arrangement further comprises a second seal arrangement, which is configured to seal the first and second housing region (F, S) off from one another fluidically.

8. The main brake cylinder arrangement according to claim 7, wherein the second seal arrangement is designed to withstand a greater pressure than the first seal arrangement.

9. The main brake cylinder arrangement according to claim 7, wherein the second seal arrangement is arranged in a housing part comprising the first housing region and the first seal arrangement is arranged in a housing part comprising the second housing region (S).

10. The main brake cylinder arrangement according to claim 1, wherein the first seal arrangement is arranged on a sleeve.

11. The main brake cylinder arrangement according to claim 10, wherein the sleeve extends through both housing parts.

12. The main brake cylinder arrangement according to claim 10, wherein the sleeve comprises a fluid duct, which extends from a region of the sleeve facing the second end of the positioning encoder element up to at least the first seal arrangement.

13. The main brake cylinder arrangement according to claim 12, wherein the fluid duct is configured at least in part on an outer circumferential surface of the sleeve, and in particular is configured to be helically formed at least in part.

14. The main brake cylinder arrangement according to claim 13, wherein at least one end region of the fluid duct extends into at least one of the receiving region and the second housing region (S).

15. The main brake cylinder arrangement according to claim 10, wherein the sleeve further comprises at least one sliding section, along which the position encoder element is guided displaceably.

* * * * *